United States Patent
Foskett et al.

(10) Patent No.: US 10,719,311 B2
(45) Date of Patent: Jul. 21, 2020

(54) FUNCTION LIBRARY BUILD ARCHITECTURE FOR SERVERLESS EXECUTION FRAMEWORKS

(71) Applicant: Accenture Global Solutions Limited, Dublin (IE)

(72) Inventors: Roger Foskett, Middlesex (GB); Thomas W. Myers, LaGrange, IL (US)

(73) Assignee: Accenture Global Solutions Limited, Dublin (IE)

( * ) Notice: Subject to any disclaimer, the term of this patent is extended or adjusted under 35 U.S.C. 154(b) by 6 days.

(21) Appl. No.: 15/699,184

(22) Filed: Sep. 8, 2017

(65) Prior Publication Data

US 2019/0079750 A1    Mar. 14, 2019

(51) Int. Cl.
*G06F 8/71* (2018.01)
*G06F 9/50* (2006.01)

(52) U.S. Cl.
CPC .............. *G06F 8/71* (2013.01); *G06F 9/5072* (2013.01)

(58) Field of Classification Search
CPC ....... G06F 9/45558; G06F 2009/45562; G06F 9/50; G06F 9/5044; G06F 9/5055; G06F 9/5077; G06F 11/0709; G06F 11/2023; G06F 2009/4557; G06F 9/5027; G06F 9/5011; G06F 8/71; G06F 9/5072
See application file for complete search history.

(56) References Cited

U.S. PATENT DOCUMENTS

| 8,769,017 | B2 * | 7/2014 | Jakobson | G06Q 50/01 709/204 |
| 8,886,806 | B2 * | 11/2014 | Tung | G06F 9/5072 709/226 |
| 8,931,038 | B2 * | 1/2015 | Pulier | G06F 9/45558 726/1 |
| 9,354,869 | B2 | 5/2016 | Apte et al. | |
| 9,621,428 | B1 | 4/2017 | Lev et al. | |
| 9,811,394 | B1 | 11/2017 | Kogias et al. | |
| 9,853,913 | B2 | 12/2017 | Foskett et al. | |
| 10,037,196 | B2 * | 7/2018 | McPherson | G06F 8/36 |
| 2010/0082556 | A1 * | 4/2010 | Srinivasan | G06F 8/72 717/106 |
| 2010/0306379 | A1 | 12/2010 | Ferris | |

(Continued)

OTHER PUBLICATIONS

Alfonso Perez et al.; Serverlesscomputingforcontainer-basedarchitectures; Elsevier; pp. 50-59; retrieved on Mar. 5, 2020. (Year: 2018).*

(Continued)

*Primary Examiner* — S. Sough
*Assistant Examiner* — Cuong V Luu
(74) *Attorney, Agent, or Firm* — Brinks Gilson & Lione (57) ABSTRACT

A library may include serverless artifacts that support execution of respective serverless functions. For each of the artifacts, a build parameter may have a library artifact identifier, a respective execution environment specifier, and a respective component specifier. An infrastructure realization knowledge base may define an environment mapping for each of the serverless artifacts. A build execution engine may create a build script that can be executed on a serverless artifact build infrastructure. To implement the build script the build script may be transmitted over a build communication channel to a cloud based serverless infrastructure provider.

20 Claims, 6 Drawing Sheets

(56) References Cited

U.S. PATENT DOCUMENTS

| | | | |
|---|---|---|---|
| 2011/0231899 A1* | 9/2011 | Pulier | G06F 9/45558 726/1 |
| 2012/0072581 A1* | 3/2012 | Tung | G06F 9/5072 709/224 |
| 2012/0239825 A1 | 9/2012 | Xia et al. | |
| 2013/0346946 A1 | 12/2013 | Pinnix | |
| 2014/0278623 A1 | 9/2014 | Martinez et al. | |
| 2014/0317716 A1 | 10/2014 | Chao et al. | |
| 2015/0358810 A1 | 12/2015 | Chao et al. | |
| 2016/0098263 A1* | 4/2016 | Spivak | G06F 9/5055 717/170 |
| 2016/0124742 A1 | 5/2016 | Rangasamy et al. | |
| 2016/0216948 A1* | 7/2016 | McPherson | G06F 8/71 |
| 2017/0003960 A1 | 1/2017 | Subramanian et al. | |
| 2017/0026416 A1 | 1/2017 | Carpenter et al. | |
| 2017/0046134 A1 | 2/2017 | Straub | |
| 2017/0052764 A1 | 2/2017 | Laskey et al. | |
| 2017/0064012 A1 | 3/2017 | Duell et al. | |
| 2017/0192765 A1 | 7/2017 | Smith et al. | |
| 2017/0207968 A1* | 7/2017 | Eicken | H04L 41/0843 |
| 2017/0249393 A1 | 8/2017 | Nair et al. | |
| 2018/0095771 A1 | 4/2018 | Warkentin et al. | |
| 2018/0107525 A1 | 4/2018 | Govindaraju et al. | |
| 2018/0181439 A1* | 6/2018 | Jackson | G06F 9/5016 |
| 2018/0201371 A1 | 7/2018 | Kramer | |

OTHER PUBLICATIONS

Michael Wurster et al.; Modeling and Automated Deployment of Serverless Applications using TOSCA; IEEE; pp. 73-80; retrieved on Mar. 5, 2020 (Year: 2018).*
U.S. Appl. No. 15/699,207, filed Sep. 8, 2017, Foskett et al.
U.S. Appl. No. 15/827,815, filed Nov. 30, 2017, Foskett et al.
State—Terraform by HashiCorp, "State" URL: https://www.terraform.io/docs/state/index.html obtained from the Internet on Sep. 19, 2017, 2 pages.
State—Terraform by HashiCorp, "Purpose of Terraform State" URL: https://www.terraform.io/docs/state/purpose.html obtained from the Internet on Sep. 19, 2017, 3 pages.
Configuring Resources—Terraform by HashiCorp, "Resource Configuration" URL: https://www.terraform.io/docs/configuration/resources.html obtained from the Internet on Sep. 19, 2017, 9 pages.
Load Order and Semantics—Terraform by HashiCorp, "Load Order and Semantics" URL: https://www.terraform.io/docs/configuration/load.html obtained from the Internet on Sep. 19, 2017, 1 page.
Configuration Syntax—Terraform by HashiCorp, "Configuration Syntax" URL: https://www.terraform.io/docs/configuration/syntax.html obtained from the Internet on Sep. 19, 2017, 4 pages.
Interpolation Syntax—Terraform by HashiCorp, "Interpolation Syntax" URL: https://www.terraform.io/docs/configuration/interpolation.html obtained from the Internet on Sep. 19, 2017, 15 pages.
Overrides—Terraform by HashiCorp, "Overrides" URL: https://www.terraform.io/docs/configuration/override.html obtained from the Internet on Sep. 19, 2017, 2 pages.
Configuration Resources—Terraform by HashiCorp, "Resource Configuration" URL: https://www.terraform.io/docs/configuration/resources.html obtained from the Internet on Sep. 19, 2017, 9 pages.
Configuring Data Sources—Terraform by HashiCorp, "Data Source Configuration" URL: https://www.terraform.io/docs/configuration/data-sources.html obtained from the Internet on Sep. 19, 2017, 4 pages.
Configuring Providers—Terraform by HashiCorp, "Provider Configuration" URL: https://www.terraform.io/docs/configuration/providers.html obtained from the Internet on Sep. 19, 2017, 5 pages.
Configuring Variables—Terraform by HashiCorp, "Variable Configuration" URL: https://www.terraform.io/docs/configuration/variables.html obtained from the Internet on Sep. 19, 2017, 9 pages.
Configuring Outputs—Terraform by HashiCorp, "Output Configuration" URL: https://www.terraform.io/docs/configuration/outputs.html obtained from the Internet on Sep. 19, 2017, 3 pages.
Configuring Local Values—Terraform by HashiCorp, "Local Value Configuration" URL: https://www.terraform.io/docs/configuration/locals.html obtained from the Internet on Sep. 19, 2017, 4 pages.
Configuring Modules—Terraform by HashiCorp, "Module Configuration" URL: https://www.terraform.io/docs/configuration/modules.html obtained from the Internet on Sep. 19, 2017, 2 pages.
Configuring Terraform—Terraform by HashiCorp, "Terraform Configuration" URL: https://www.terraform.io/docs/configuration/terraform.html obtained from the Internet on Sep. 19, 2017, 3 pages.
Configuring Terraform Enterprise—Terraform by HashiCorp, "Terraform Enterprise Configuration" URL: https://www.terraform.io/docs/configuration/terraform-enterprise.html obtained from the Internet on Sep. 19, 2017, 2 pages.
Environment Variables—Terraform by HashiCorp, "Environment Variables" URL: https://www.terraform.io/docs/configuration/environment-variables.html obtained from the Internet on Sep. 19, 2017, 4 pages.
Office Action in U.S. Appl. No. 15/699,207, dated Nov. 13, 2018, pp. 1-16.
Ognjen Scekic, Programming Model Elements for Hybrid Collaborative Adaptive Systems, 2015, pp. 278-287, <https://ieeexplore.ieee.org/stamp/stamp.jsp?tp=&arnumber=7423093> (Year: 2016).
Garrett McGrath, Cloud Event Programming Paradigms Applications and Analysis, 2016, pp. 1-7, <https://ieeexplore.ieee.org/stamp/stamp.jsp?tp=&arnumber=7820297> (Year: 2016).
Brikman, Yevgeniy, "A Comprehensive Guide to Terraform—Gruntwork", Sep. 26, 2016, pp. 1-6, available at https://blog.gruntwork.io/a-comprehensive-guide-to-terraform-b3d32832baca.
Brikman, Yevgeniy, "How to manage Terraform state—Gruntwork", Oct. 3, 2016, pp. 1-19, Available at https://blog.gruntwork.io/how-to-manage-terraform-state-28f5697e68fa.
Brikman, Yevgeniy, "How to use Terraform as a team—Gruntwork", Oct. 12, 2016, pp. 1-18, Available at https://blog.gruntwork.io/how-to-use-terraform-as-a-team-251bc1104973.
Anonymous, "AWS: aws_lambda_function-Terraform by HashiCorp https", Jul. 7, 2017, pp. 1-6, Available at https://web.archive.org/web/20170707015003/https://www.terraform.io/docs/providers/aws/r/lambda_function.html.
Anonymous: "What is AWS Lambda?—AWS Lambda", Jul. 10, 2017, pp. 1-4, Available at https://web.archive.org/web/20170710111343/http://docs.aws.amazon.com.80/lambda/latest/dg/welcome.html.
Brikman, Yevgeniy, "Terraform: Up and Running: Writing Infrastructure as Code", Mar. 7, 2017, O'Reilly Media, XP002786888, ISBN: 1491977086.
Anonymous: "Status Checks for Your Instances—Amazon Elastic Compute Cloud", Jul. 29, 2017, pp. 1-8, Available at https://web.archive.org/web/20170729004009/https://docs.aws.amazon.com/AWSEC2/latest/UserGuide/monitoring-system-instance-status-check.html.
Amazon Web Services: "AWS re:Invent 2015(DV0209) JAWS: The Monstrously Scalable Severless Framework", Oct. 12, 2015, Available at https://www.youtube.com/watch?v=D_U61u06l90.
Corbet: "2.5.59+ kernel makefile documentation [LWN.net]", Feb. 4, 2003, pp. 1-17, Available at https://1wn.net/Articles/21835.
Virakraingsei Hai Socheat: "Automatic and scalable cloud framework for parametric studies using scientific applications", Sep. 1, 2016, pp. 1-50, Available at https://uu.diva-portal.org/smah/get/diva2:1045455/FULLTEXT01.pdf.
Extended European Search Report issued in European patent application No. EP18193487 dated Jan. 30, 2019, 19 pages.
European Search Report issued in European patent application No. EP18193482 dated Feb. 12, 2019, 10 pages.
Theo Dimitrakos, Common capabilities for service oriented infrastructures and platforms, 2010, pp. 181-188. https://ieeexplore.ieee.org/stamp/stamp.jsp?tp=&arnumber=5693260 (Year: 2010).
Jurgen Cito, An Empirical Analysis of the Docker Container Ecosystem on GitHub, 2017, pp. 323-332. https://ieeexplore.ieee.org/stamp/stamp.jsp?tp=&arnumber=7962382 (Year: 2017).
Maciej Malawski, Towards Serverless Execution of Scientific Workflows—HyperFlow Case Study, 2016, pp. 25-32 http://ceur-ws.orgNol-1800/paper4.pdf (Year: 2016).

(56) References Cited

OTHER PUBLICATIONS

Ikuo Nakagawa, A design and implementation of global distributed POSIX file system on the top of multiple independent cloud services, 2016, pp. 867-872. https://ieeexplore.ieee.org/stamp/stamp.jsp?tp=&arnumber=7557734 (Year: 2016).

* cited by examiner

FUNCTION LIBRARY BUILD ARCHITECTURE FOR SERVERLESS EXECUTION FRAMEWORKS

TECHNICAL FIELD

This application relates to building function libraries in technically challenging serverless execution frameworks.

BACKGROUND

The processing power, memory capacity, network connectivity and bandwidth, available disk space, and other resources available to processing systems have increased exponentially in recent decades. These resources have for many years been powerful enough to allow a single physical server to host many instances of virtual machines (VMs) and virtualized functions (VFs). These advances had led to the extensive provisioning of a wide spectrum of functionality into specific pockets of concentrated physical processing resources that may be located virtually anywhere, i.e., in the cloud. A more recent development is serverless execution frameworks that eliminate the need for statically provisioned servers and instead provision and execute functions dynamically, e.g., in response to pre-defined triggers. Improvements in serverless execution frameworks will drive the further development and implementation of flexible functionality into the cloud.

DETAILED DESCRIPTION

The Figures described below provide an example context for the discussion of technical solutions for a function library build architecture for serverless execution frameworks presented in detail below. The examples in the Figures show one of many possible different implementation contexts. In that respect, the technical solutions are not limited in their application to the architectures and systems shown in the Figures, but are applicable to many other implementations, architectures, and processing. Although the discussion below primarily uses the example of serverless functions as the build artifacts, the functionality of the architecture extends to any other type of code artifact that must properly function in a serverless execution framework.

Figure 1:
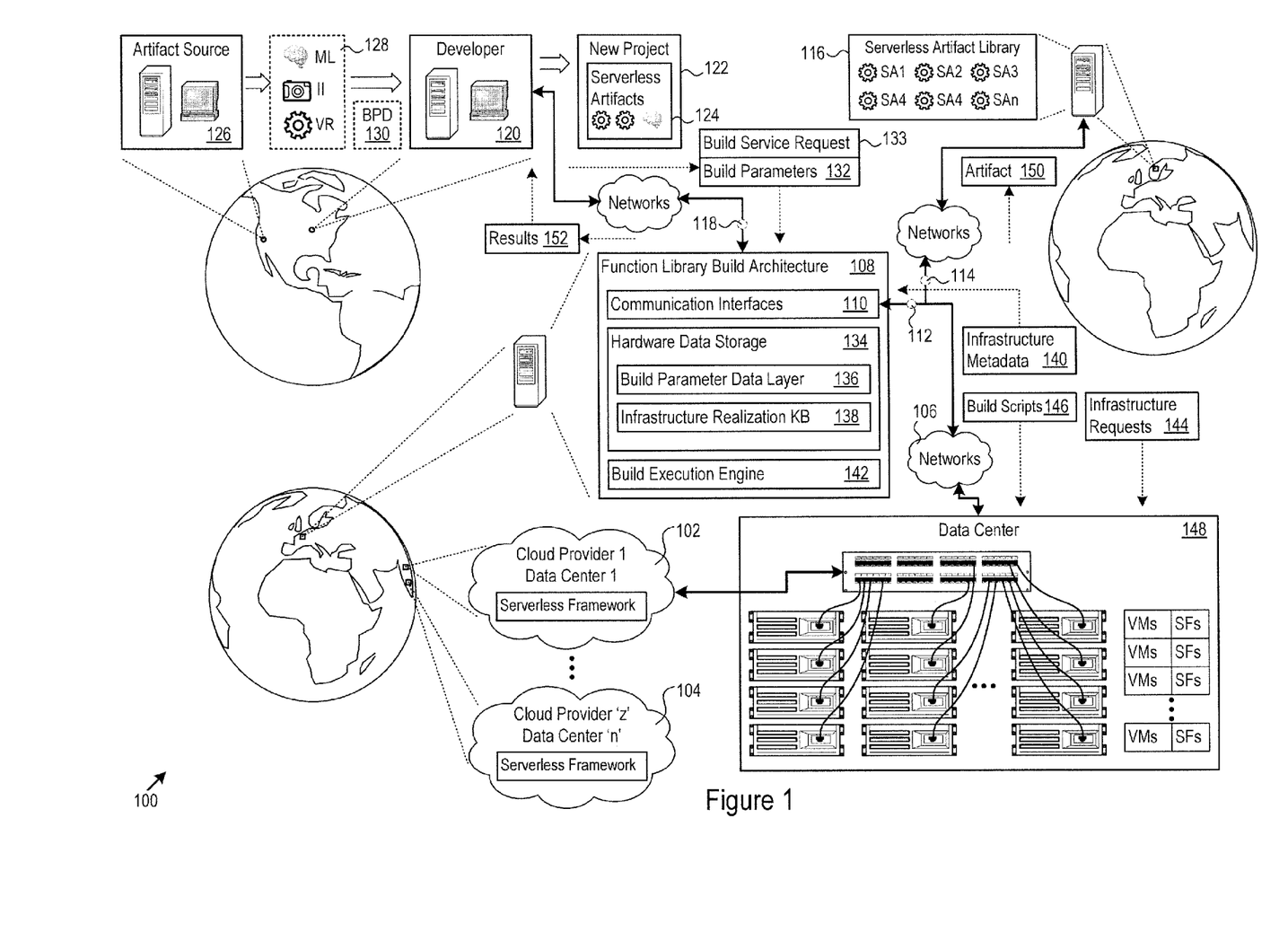
FIG. 1 shows an example of a global network architecture.

FIG. 1 shows entities communicating across a global network 100. For instance, distributed across the global network 100 are cloud based serverless infrastructure providers, e.g., the infrastructure providers 102 and 104. The infrastructure providers may be located in any geographic region, e.g., United States (US) East, US West, India or Central Europe. The geographic regions that characterize the infrastructure providers may be defined according to any desired distinctions to be made with respect to location. An infrastructure provider may provide cloud computing infrastructure in multiple geographic locations and provide different resources depending on location.

The infrastructure providers provide computing resources through delivery platforms that are generally publicly available. Infrastructure providers may additionally or alternatively provide computing resources "on-premises", which typically refers to a location inside the enterprise that uses the resources, often including increased privacy, security, and control compared to public cloud resources. Examples of infrastructure providers include Amazon, Google, Microsoft, and Accenture, who offer, e.g., Amazon Web Services (AWS), Google Compute Engine (GCE), Microsoft Azure (Azure), and Windows Azure Pack (WAP), as just a few examples.

Throughout the global network 100 are networks, e.g., the network 106, that provide connectivity within the infrastructure providers and between the infrastructure providers and other entities. The networks 106 may include private and public networks defined over any pre-determined and possibly dynamic internet protocol (IP) address ranges.

An artifact build architecture ("architecture") 108 makes complex serverless artifact build provisioning and artifact build execution decisions. In doing so, the architecture 108 takes into account the particular requirements and capabilities of the infrastructure providers. The provisioning and execution decisions are discussed in detail below. These decisions include, as examples, determining what resources to instantiate at the infrastructure provider to perform builds for complex serverless artifacts used by serverless functions, determining how to post-instantiation configure the resources, coordinating execution of build tools, monitoring build success and failure, and coordinating inserting the build artifact into a shared library of serverless artifacts that many be used as complex components of serverless functions. The discussion below addresses the technical challenges of ensuring proper execution of machine-dependent serverless functions. Machine-dependent serverless functions are serverless functions that require machine-dependent complied artifacts. Accordingly, references below to "serverless functions" should generally be read as references to machine-dependent serverless functions, in support of which the architecture 108 executes technical innovative build techniques for any number of underlying machine-dependent artifacts.

In the example in FIG. 1, the architecture 108 includes communication interfaces 110 that establish communication channels with other entities in the global network 100. Similarly, the communication interfaces in the infrastructure provider data centers and the service requesters 120 also establish communication channels with the other entities in the global network 100. A few examples of communication channels running on top of the communication physical hardware include: HTTP, HTTPS, FTP, SMTP, Web Services, SOAP over HTTP/HTTPs, and REST over HTTP/HTTPs communication channels. FIG. 1 shows a build communication channel 112 to the infrastructure providers, a library communication channel 114 to a target serverless artifact library 116, and a requester communication channel 118 to a build service requester 120.

For the purposes of discussion below, the build service requester 120 is a software developer working on a new project 122 for a driverless car simulation engine that is required to execute in the context of serverless functions composed from individual artifacts. The artifacts are not inherently serverless, but need to be prepared for execution in a serverless function context. For the purposes of discussion below, these artifacts are therefore referred to as serverless artifacts 124. Components that are available for building a new project may come from many different sources, including the developer itself. In FIG. 1, a separate entity, the artifact source 126 creates, parameterizes, and describes some of the available components 128. Just for the purposes of discussion, FIG. 1 shows that the available components 128 include a driverless navigation machine learning (ML) artifact, an image interpretation (II) artifact, and a voice recognition (VR) artifact tailored to voice controlled driving and navigation.

The artifact source 126 provides build parameter data for the artifacts it develops. As a few examples, the build parameter data "(BPD)" 130 may include an artifact identifier, e.g., a name for a code segment, and execution environment specifiers of a hardware environment required to build the function, to execute the function, or both. Examples of hardware execution environments include: specific types or configurations of CPUs, e.g., an x86 architecture CPU, a CPU with a certain number of cores and supported threads, or specific hardware instruction sets that the function requires, e.g., MMX, SSEn, AVX, and cryptographic instructions; specific memory architectures, e.g., amount, type, speed, and capabilities (e.g., EEC) for DRAM; and specific types of I/O or network interfaces. Additional examples of build parameter data 130 include a component specifier of a software pre-requisite for the serverless artifact and a tool specifier of a build tool for the serverless artifact. Examples of software pre-requisites include libraries, modules, and include files needed for compilation of the artifact. Examples of build tools include specific language compilers (e.g., a C or C++ compiler), assemblers, and linkers. The build service requester 120 supplies build parameter data as the build parameters 132 to the architecture 108, e.g., along with a build service request 133 to request build services from the architecture 108.

The architecture 108 stores the build parameters 132 in hardware data storage 134. In one implementation, the hardware data storage 134 defines a build parameter data layer 136, and an infrastructure realization knowledge base 138. The build parameter data layer 136 retains the build parameters received from any number of service requesters. The infrastructure realization knowledge base 138 stores an environment mapping from serverless function infrastructure available from the infrastructure providers to the execution environments captured in the build parameter data layer 136. As will be described in more detail below, the architecture 108 may build its infrastructure realization knowledge base 138 responsive to infrastructure metadata 140 received from the infrastructure providers.

The build execution engine 142 in the architecture 108 carries out the complex task of actually causing the infrastructure providers to build the required artifacts for the new project 122 in a manner that makes the artifacts compatible with serverless execution environments and the build parameters. To that end, the build execution engine 142 transmits infrastructure requests 144 and build scripts 146 to selected infrastructure providers for execution within an infrastructure provider data center 148. The build execution engine 142 also directs, e.g., through instructions in the build scripts 146, insertion of the successfully built artifact 150 into the target serverless artifact library 116, and returns build results 152, e.g., success, failure, and warning messages, and target library artifact links or access references and instructions to the build service requester 120.

Figure 2:
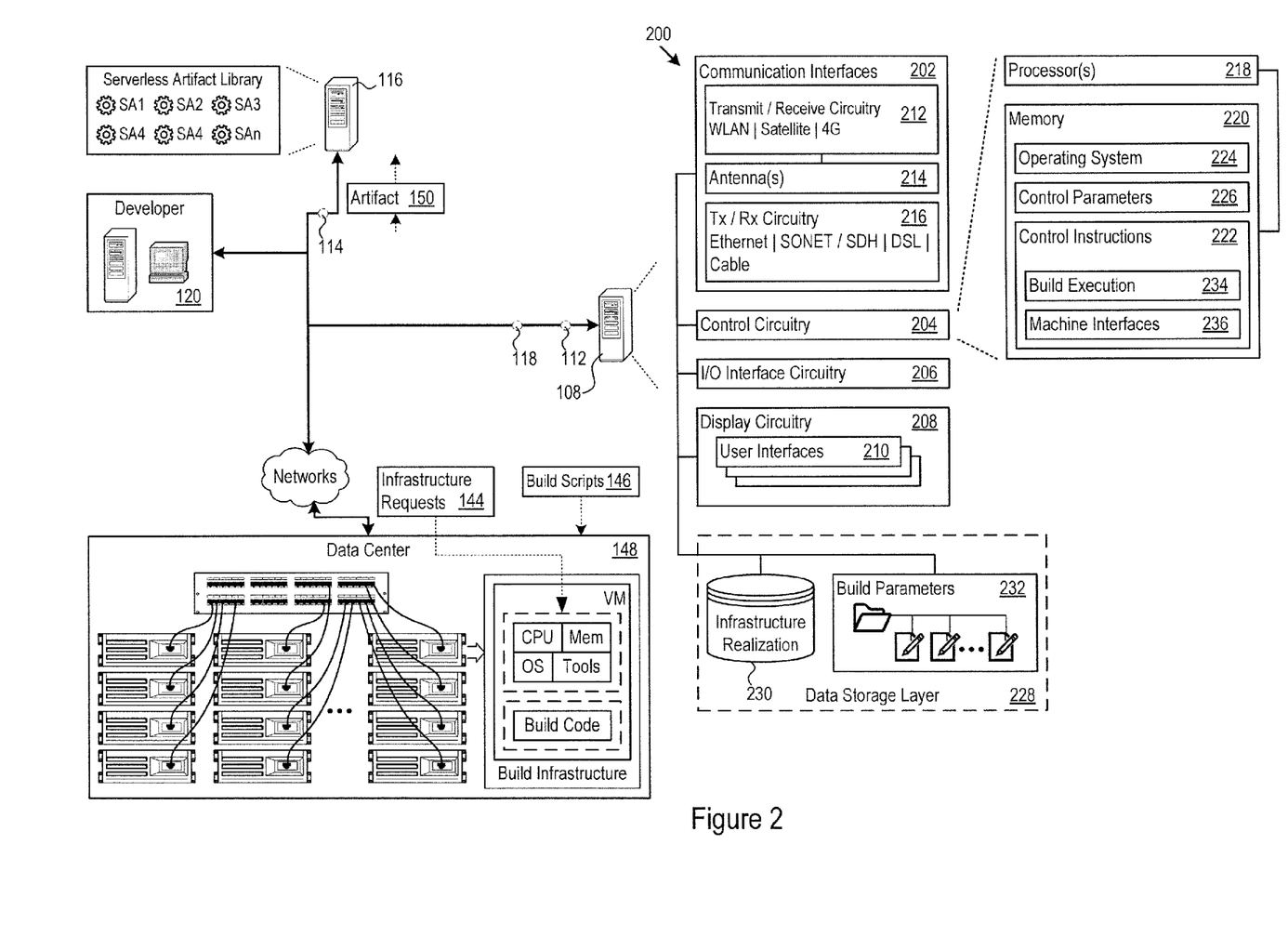
FIG. 2 illustrates an example implementation of an artifact build architecture.

FIG. 2 shows an example implementation 200 of the architecture 108. The architecture 108 includes communication interfaces 202, control circuitry 204, input/output (I/O) interface circuitry 206, and display circuitry 208. The architecture 108 generates the GUIs 210 locally using the display circuitry 208, or for remote visualization, e.g., as HTML, JavaScript, audio, and video output for a web browser running on a local or remote machine. Among other interfaces, the GUIs 210 may include interfaces for build service submission, specification of build parameter data, reporting of build service execution status and results, reporting access links or other details for artifacts built and inserted into an artifact library, and other features.

The GUIs 210 and the I/O interface circuitry 206 may include touch sensitive displays, voice or facial recognition inputs, keyboards, mice, speakers and other user interface elements. Additional examples of the I/O interface circuitry 206 include microphones, video and still image cameras, headset and microphone input/output jacks, Universal Serial Bus (USB) connectors, memory card slots, and other types of inputs. The I/O interface circuitry 206 may further include magnetic or optical media interfaces (e.g., a CDROM or DVD drive), serial and parallel bus interfaces, and keyboard and mouse interfaces.

The communication interfaces 202 may include hardware such as wireless transmitters and receivers ("transceivers") 212 and any antennas 214 used by the transmit and receive circuitry of the transceivers 212. The transceivers 212 and antennas 214 may support WiFi network communications, for instance, under any version of IEEE 802.11, e.g., 802.11n or 802.11ac. The communication interfaces 202 may also include physical medium transceivers 216. The physical medium transceivers 216 may provide physical layer interfaces for any of a wide range of communication protocols, such as any type of Ethernet, data over cable service interface specification (DOCSIS), digital subscriber line (DSL), Synchronous Optical Network (SONET), or other protocol.

The control circuitry 204 may include any combination of hardware, software, firmware, or other circuitry. The control circuitry 204 may be implemented, for example, with one or more systems on a chip (SoC), application specific integrated circuits (ASIC), microprocessors, discrete analog and digital circuits, and other circuitry. The control circuitry 204 may implement any desired functionality in the architecture 108, including the hardware data storage 134, the build parameter data layer 136, the infrastructure realization knowledge base 138, and the build execution engine 142.

As just one example, the control circuitry 204 may include one or more instruction processors 218 and memories 220. The memories 220 store, for example, control instructions 222 and an operating system 224. In one implementation, the processor 218 executes the control instructions 222 and the operating system 224 to carry out any desired functionality for the architecture 108, including the functionality described above and below regarding serverless artifact builds and library insertion. The control parameters 226 provide and specify configuration and operating options for the control instructions 222, operating system 224, and other functionality of the architecture 108.

The architecture 108 may include a data storage layer 228 that hosts any number of local data repositories. In the example shown in FIG. 2, the data storage layer 228 includes a infrastructure realization knowledge base 230 and build parameters 232 for any number of past or present build service requests. While the data storage layer 228 is shown local to the architecture 108, the architecture 108 may connect to any network entity to access and exchange other sources of infrastructure realization knowledge bases, or any other data that facilitates serverless artifact build and library insertion.

The control instructions 222 drive the functionality of the architecture 108. Described in more detail below, the control instructions 222 may implement build execution logic 234 and machine interface logic 236. The build execution logic 234 carries out the complex task of ensuring that the build requests received from the service requester 120 result in a build artifact that will operate properly in a serverless function framework and that is available in the target library. The machine interface logic 236 generates the GUIs 210 to provide interfaces for communicating with other entities in the global network 100, including with the build service requester 120 to receive build requests and build parameter data and to return results.

There are many technical challenges involved with building artifacts that will execute properly in a serverless execution framework, e.g., AWS Lambda. Serverless execution faces the unique challenge that it can be hard to predict when a function will run, and the serverless nature of execution means that the infrastructure resources instantiated to run the function may vary over time. Accordingly, in the past, any particular execution of a serverless function had little or no expectation or guarantees of what infrastructure resources would handle function execution. Furthermore, even when an infrastructure provider happened to instantiate resources that would allow the function to execute properly, the infrastructure provider frequently changed how functions already built were later executed as serverless functions. These changes result from the ongoing evolution of the virtual resources made available at the infrastructure provider, and include (as just one example) changes to the specific resources that constitute the underlying virtual hardware platform instantiated to run the serverless function. Because some serverless function code requires specific underlying hardware, the ongoing evolution of virtual resources could often dramatically cripple function execution or completely break the virtual functions. As one specific example, a function that requires native CPU cryptographic instructions will not run on virtual resources that instantiate a CPU without such instructions.

The build parameter data layer 136, infrastructure realization knowledge base 138, build execution engine 142, data storage layer 228, build execution logic 234, and machine interface logic 236, as well as the structure and content of the generated GUIs improve the operation and function of the underlying computer hardware itself. That is, these features (among others described below) are specific improvements in way that the underlying computer system operates and solve technical challenges with building serverless artifacts. The improvements facilitate more efficient, accurate, consistent, and precise building of artifacts that will operate properly in serverless function environments. The improved functioning of the underlying computer hardware itself achieves further technical benefits. For example, the architecture 108 avoids lack of automation, reduces manual intervention, reduces the possibility for human error, and therefore increases build completion efficiency and reduces wait times for correct completion of complex artifact build processes. In addition, the architecture 108 provides separate of concern, so that the service requester 120 and the artifact source 126 are isolated from the complex serverless infrastructure decisions. These entities can instead concentrate on developing artifacts and new projects and allow the architecture 108 to ensure they run properly in a serverless environment.

Figure 3:
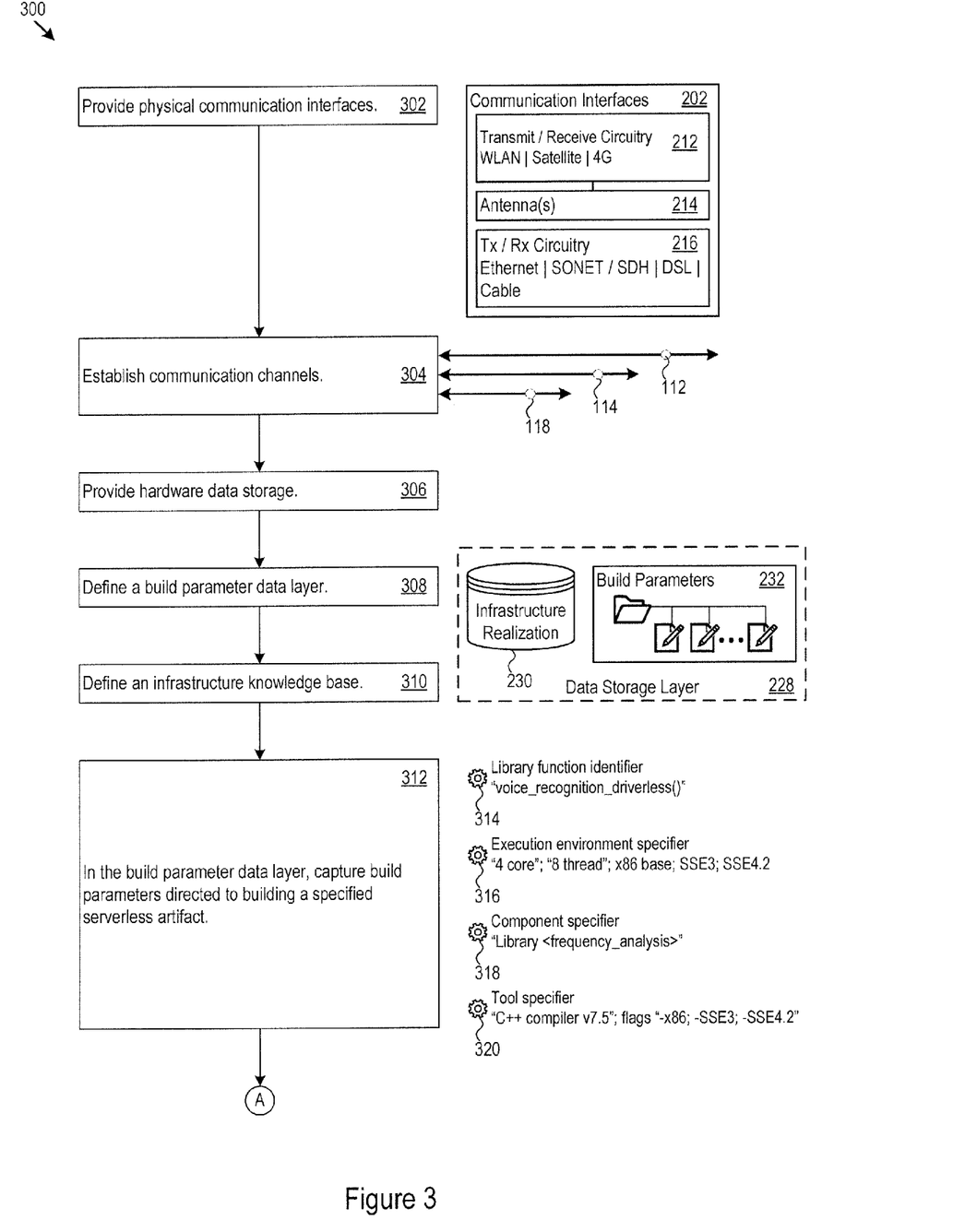
FIGS. 3-4 show an example of the logic, processing, and configurations implemented in the artifact build architecture.
Figure 4:
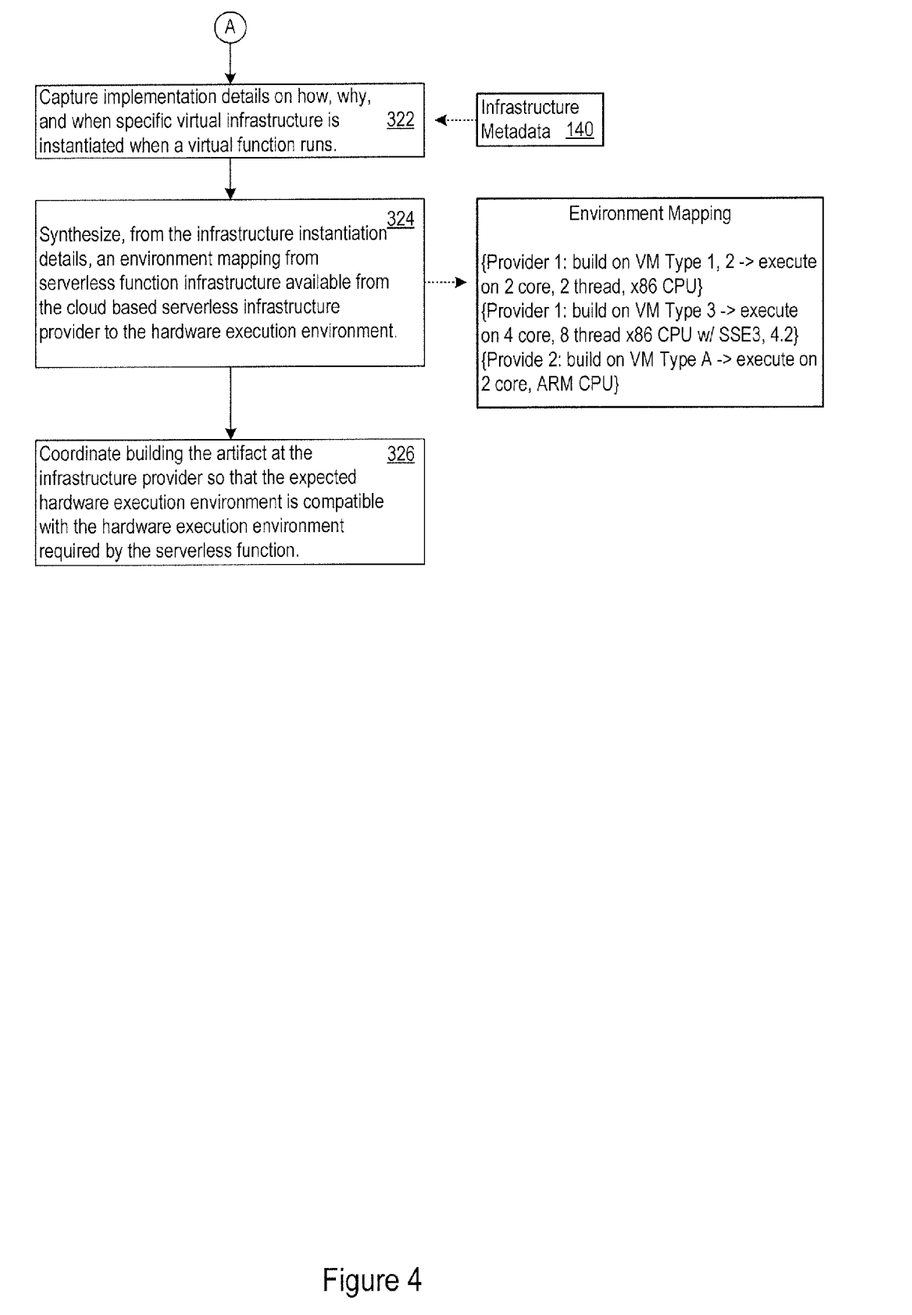

FIGS. 3-4 show an example of the logic implemented by the architecture 108, including, e.g., in the build execution engine 142 and in the control circuitry 204. The architecture 108 provides physical communication interfaces 202 (302) and establishes communication channels running over the physical hardware (304). Examples of these communication channels include a build communication channel 112 to the infrastructure providers 102 and 104, a library communication channel 114 to a target serverless artifact library 116, and a requester communication channel 118 to a build service requester 120.

The architecture 108 also provides hardware data storage 134 (306) which may include solid state and magnetic hard disk storage drives and drive arrays, as examples. The architecture 108 may organize the hardware data storage 134 in many different ways. For instance, the architecture 108 may define a build parameter data layer (308) and an infrastructure realization knowledge base (310).

Within the build parameter data layer, the architecture 108 may capture a wide range of build parameters (312), including as examples: an artifact identifier 314 of a serverless artifact to build, e.g., a piece of code labeled "voice_recognition_driverless( )"; and an execution environment specifier 316 of a hardware execution environment where the serverless function (that will include the artifact to build) will execute. In this particular example, the execution environment specifier 316 captures that the serverless function runs on a 4 core, 8 thread CPU, that the CPU must have an x86 base architecture, and that the CPU must include the SSE3 and SSE4.2 instruction sets. The build parameters guide the architecture 108 in accomplishing the following technical challenge: A serverless function 'F' will run in a hardware execution environment 'E'; 'F' will include an artifact 'A'; therefore the architecture 108 needs to build 'A' in the environment 'E'. In order to build 'A' in 'E', the architecture 108 provides prerequisite components to 'A' and the build tools, e.g., the software tools, to perform the build of 'A' in 'E'. The architecture 108 stores the resultant build of 'A' in the artifact library 116, where any other serverless function executing in 'E' may include 'A'.

Additional examples of build parameter are the component specifier 318 and the tool specifier 320. The component specifier 318 may indicate a software pre-requisite for the serverless artifact to build, e.g., that the library "frequency_analysis" is available during compilation. The tool specifier 320 indicates the tools that run to build the artifact, as well as flags, arguments, and other parameters for the tools. In this example, the tool specifier 320 notes that version 7.5 of the C++ compiler is required, and should be supplied with flags to indicate x86 architecture with SSE3 and SSE4.2 instruction sets.

Within the infrastructure realization knowledge base 138, the architecture 108 captures implementation details concerning how, why, and when certain types of virtual infrastructure are instantiated when a virtual function runs (322). The infrastructure providers may specify these details in any type of communication to the architecture 108. For instance, the details may flow to the architecture in the form of infrastructure metadata 140 provided by any of the infrastructure providers. Other sources of these details include expert knowledge from prior experience, newsgroup, forum or blog posts, technical bulletins posted on infrastructure provider web sites, and the like.

As one example, the architecture 108 synthesizes, from the infrastructure instantiation details, an environment mapping from serverless function execution infrastructure available from the cloud based serverless infrastructure provider to the hardware execution environment (324) required by the serverless artifact to build. Expressed another way, the environment mapping captures a current state of changing infrastructure implementations at the serverless infrastructure provider. The current state captures how functions currently built on the changing infrastructure is later executed as a serverless function. In particular, the current state may capture an expected hardware execution environment for the function when it is later executed as a serverless function with that infrastructure provider. In this regard, the environment mapping identifies, for the build execution engine 142, build options that provide expected hardware execution environments for serverless function execution, so that the architecture 108 can build artifacts for the serverless function to use in those execution environments, in preparation for when the serverless function executes.

The environment mapping is one way of representing expert knowledge about how individual infrastructure providers execute serverless functions. The expert knowledge may take other forms, including rule sets or hardcoded program instructions. More generally, the expert knowledge evaluated in the architecture 108 captures the relationship between build environments and subsequent serverless function run time environments. The architecture 108 may then choose a build environment that is later expected to provide a run time environment that is compatible with the requirements captured in the build parameters 132.

In the example in FIG. 4, the environment mapping captures expert knowledge as rules that map from build environments to run environments:

{Provider 1: build on VM Type 1, 2 with configuration A→will execute on 2 core, 2 thread, x86 CPU}

{Provider 1: build on VM Type 3, with configuration B→will execute on 4 core, 8 thread x86 CPU} 1

{Provide 2: build on VM Type A, with configuration C→will execute on 2 core, ARM CPU}

The architecture 108 coordinates building the function with the infrastructure provider so that the expected hardware execution environments are compatible with the hardware execution environment required by the serverless function (326). Continuing the example above, the architecture 108 may search the infrastructure realization knowledge base 138 to identify that a viable build option. Namely, building the requested function with infrastructure provider 1 on a type 3 VM results in serverless function execution on resources that include a 4 core, 8 thread, x86 architecture CPU with SSE3 and SSE4.2. The other build options do not provide compatible execution environments for the function.

Figure 5:
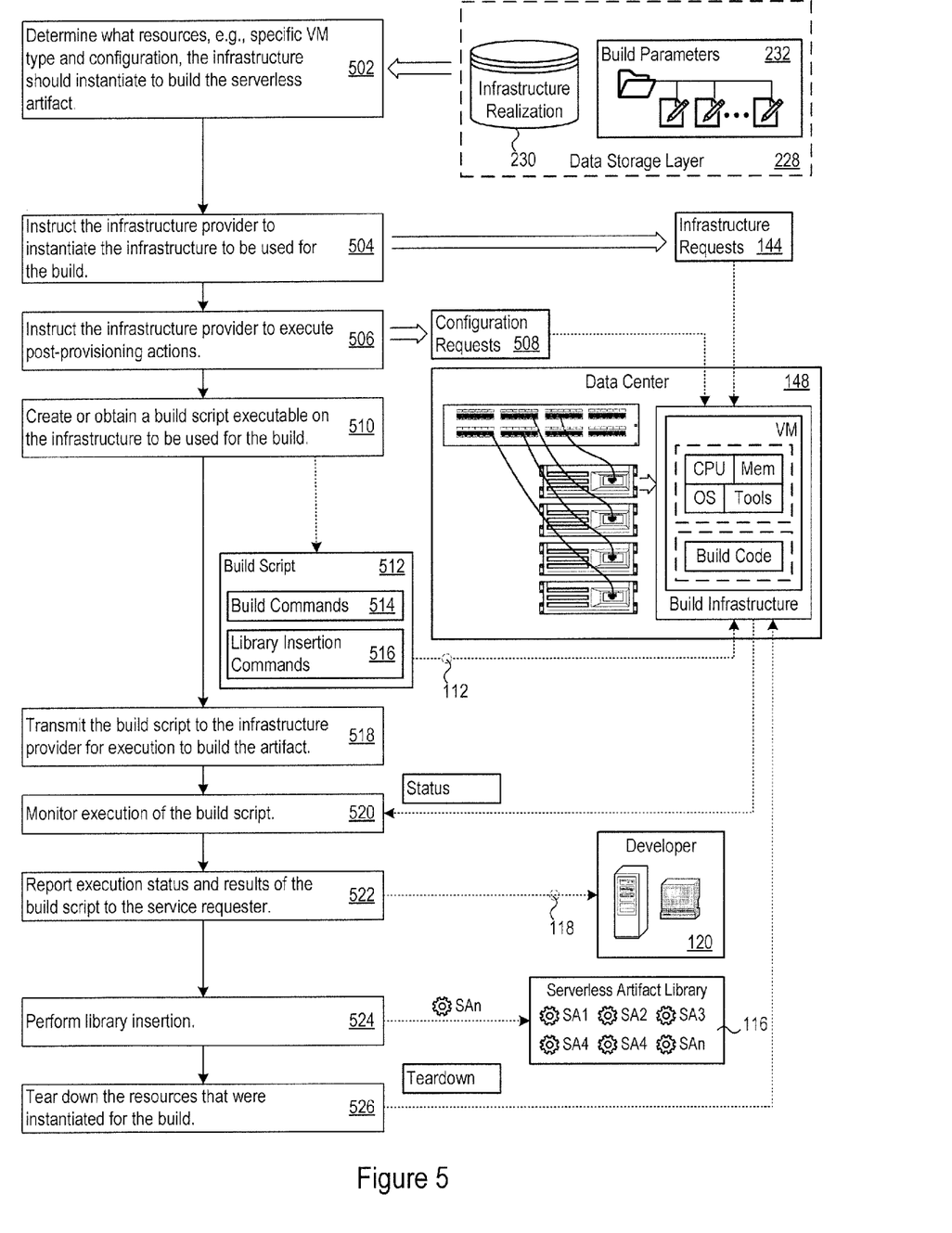
FIG. 5 illustrates an example of logic that the architecture may implement for coordinated building of the serverless function with an infrastructure provider.

FIG. 5 illustrates an example of logic 500 that the architecture 108 may implement for coordinated building of the serverless artifact with an infrastructure provider. Responsive to the environment mapping and the build parameters 132, the architecture determines what resources, e.g., specific a VM type and configuration, the infrastructure should instantiate (502) to build the serverless artifact. The selection of resources may extend to many different resource attributes, and include characteristics such as VM size or type, VM disk image, post-provisioning VM configuration, and the like. The architecture 108 then instructs the infrastructure provider to instantiate the infrastructure to be used for the build (504) and to execute the post-provisioning actions (506), e.g., by transmitting configuration requests 508 to the infrastructure provider.

The architecture 108 also creates or obtains (e.g., from a script library) a build script 512 executable on the build infrastructure (510). The build script 512 is based on the build parameters 132, and reflects the requirements captured by the component specifier and the tool specifier. The build script 512 may include build commands 514, that when executed, build the serverless artifact on the build infrastructure. The build script 512 may also include library insertion commands 516, that when executed, transmit the artifact after successfully being built, over the library communication channel for insertion into the target serverless artifact library 116.

After the build script is ready, the architecture 108 transmits the build script 512 over the build communication channel to the infrastructure provider for execution (518). The architecture 108 may also receive the source code for the function to build from the service requester 120 or the artifact source 126, and transmit the source code to the build infrastructure. Alternatively, the build script 512 may include source code retrieval commands that direct the build infrastructure to retrieve the source code, e.g., from the service requester 120 or the artifact source 126.

The architecture 108 monitors execution of the build script 512 (520) and reports execution status and results of the build script to the service requester 120 (522). The library insertion commands 516 may direct the insertion of a successfully built artifact into the artifact library 116 (524). In other implementation, the build script 512 may cause the provisioned resources to return the built artifact to any other destination, such as the architecture 108 or to the service requester 120. When the build script 512 is finished, the architecture 108 instructs the infrastructure provider to tear down the resources that were instantiated for the build (526).

There is a wide variation of ways in which the architecture may be implemented. Expressed another way, the architecture includes a physical communication interface configured to implement communication channels to a cloud based serverless infrastructure provider and a build service requester. The architecture 108 also includes hardware data storage defining a build parameter data set comprising a hardware execution environment required by a serverless function to build. The hardware data storage also defines an environment mapping from serverless function build infrastructure available from the cloud based serverless infrastructure provider to the hardware execution environment.

The environment mapping is a form of expert knowledge concerning how infrastructure providers operate and execute serverless functions. In one sense, the environment mapping is a form of compatibility rule. That is, the environment mapping specifies compatibility matches between an expected hardware execution environment for code built on changing infrastructure implementations at the infrastructure provider to the hardware execution environment provided to the serverless artifact or required by the serverless artifact.

In the architecture, a build execution engine is configured to respond to a build service request received from the build service requester. In that regard, the build execution engine is configured to instruct the cloud based serverless infrastructure provider to instantiate the serverless artifact build infrastructure, and to configure the serverless artifact build infrastructure. The architecture creates or obtains a build script executable on the serverless artifact build infrastructure. The build script includes build commands, that when executed, build the serverless artifact on the serverless artifact build infrastructure. The build script may also include library insertion commands, that when executed, transmit the serverless artifact, when successfully built, over the physical communication interface for insertion into the target serverless code library. The architecture transmits the build script over the physical communication interface to the cloud based serverless infrastructure provider for execution.

Figure 6:
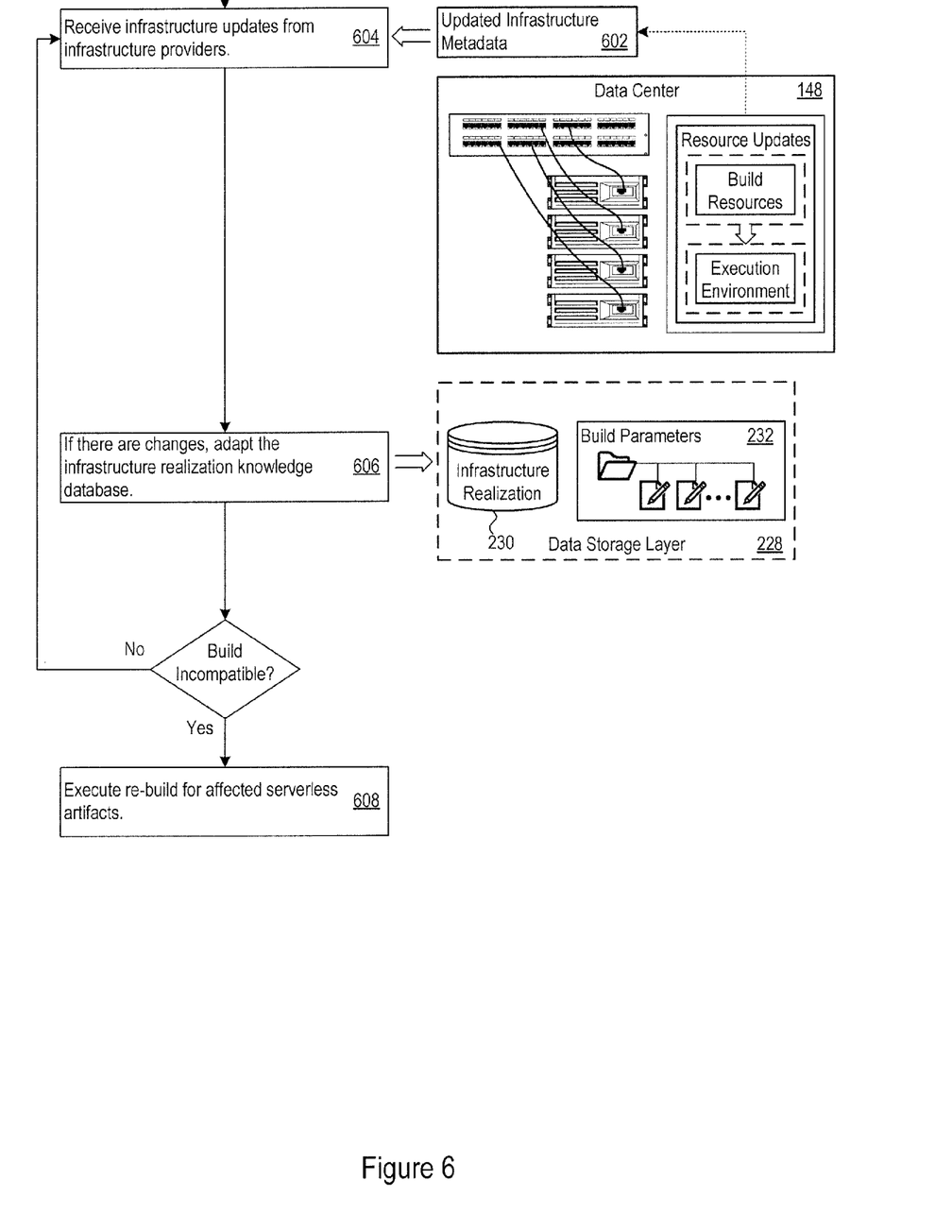
FIG. 6 shows an example of logic that the architecture may implement for automatic function rebuild.

FIG. 6 shows an example of logic 600 that the architecture 108 may implement for automatic artifact rebuild. It was noted above that infrastructure providers often change their resource implementations, and these changes may affect how serverless functions are run in the future. In particular, some changes might result in the infrastructure provider attempting to execute a serverless function on incompatible virtual resources or refusing to run the serverless function. To address this technical challenge, the architecture 108 may provide automated serverless function rebuild.

In more detail, any of the infrastructure providers may issue updated resource guidance at any time. The resource guidance may take the form of, e.g., updated infrastructure metadata 602, and may describe or capture how build resources currently map to serverless function execution environments. The architecture 108 receives these updates (604) from the infrastructure providers.

When there are changes to the mappings between build resources and execution resources, the architecture 108 adapts its infrastructure realization knowledge base 230 to reflect those changes (606). The architecture 108 may then analyze prior artifact builds to determine whether the infrastructure changes point to execution of the artifact in different execution environment that is not compatible with the build parameters for that artifact (608). Referring back to the examples in FIGS. 4 and 5, for instance, the infrastructure changes may specify that functions built on a Provider 1, Type 3 VM will now execute in a 2 core, 4 thread environment instead of a 4 core, 8 thread environment.

The architecture 108 identifies one or more serverless artifacts to rebuild due to the detected incompatibilities. The architecture 108 may request authorization for the any rebuild, e.g., from the original service requester, or may automatically initiate a rebuild (608). The rebuild process follows the logic shown in FIGS. 3-5. That is, the architecture 108 may again analyze the infrastructure realization knowledge base 230 to determine a currently compatible build infrastructure for the serverless artifact. The architecture directs the infrastructure provider to setup the build infrastructure, build the artifact, and insert the rebuilt artifact into the artifact library 116, e.g., by replacing the existing function in the library.

The build scripts 146 may include a wide variety of commands, status checks, and status output directives that provide the specified components and execute the specified tools on the build infrastructure. The build scripts 146 may be written in a wide variety of scripting or other languages, e.g., in Perl, Python, Bash, or Ruby, or, e.g., as a Chef domain specific language script. Some scripts may include, e.g., Yellowdog Updater, Modified (yum) command-line instructions to perform package installation, removal, and updating on build infrastructure running the Linux operating system, as well as 'sudo' and 'su' instructions to generally execute Linux commands.

One example of a build script is provided below in Table 1. This particular example is directed to allowing compilation of python packages on an AWS Linux EC2 instance for execution on the AWS Lambda serverless execution environment. This approach ensures that packages that contain C language extensions (e.g., rpy2, R libraries, numpy, and gevent) will operate correctly in a serverless environment. The script also includes provisions for shutting down infrastructure automatically in case an unexpected error occurs. Example status output (via loginfo commands) is also shown at the end of the table. As an overview, the script performs the following: 1) update and upgrade yum; 2) install python and C yum packages; 3) install any other required yum packages; 4) install python libraries; 5) package into python wheel file; 6) upload to bucket (e.g. the library); 7) terminate the EC2 instance at the end of the script or within 30 minutes of launching the instance if the script does not complete successfully.

TABLE 1

Build Script Example

```
$ ./.py rpy2 sandbox1 --path ../lib-python-rpy2
2017-04-18T15:40:00] Loaded 1 python libraries from
../lib-python-rpy2/requirements.txt
2017-04-18T15:40:01] UserData:
#!/bin/bash
# userdata_header
HOME=/home/cd-pypi-publish
export AWS_DEFAULT_REGION=us-east-1
PACKAGE_FILENAME=acp_rpy2-0.0.1-cp27-cp27m-manylinux_x86_64
LOGFILE=$HOME/$PACKAGE_FILENAME.log
PACKAGE_ZIP=$HOME/$PACKAGE_ FILENAME.whl
PACKAGE_S3_URI=s3://acp-platform-s-testing-sandbox1
VIRTUAL_ENV=$HOME/virtual-env
unalias cp
fatal( ) {
    ts=`date -u +%FT%T`
    echo "$ts] FATAL: $1"
    exit 1
}
INSTANCE_ID="`wget -q -0 - http://169.254.169.254/latest/meta-data/instance-id ||
fatal "wget instance-id has failed: $?"""
loginfo( ) {
    msg=$1
    ts=`date -u +%FT%T`
    line="$ts] INFO: $msg"
    echo $line
    echo $line >> $LOGFILE
    aws ec2 create-tags --resources $INSTANCE_ID --tags "Key=Status,Value=$msg"
}
EC2_TERMINATE_CMD="aws ec2 terminate-instances --instance-ids $INSTANCE_ID"
EC2_TERMINATE_CMD="$EC2_TERMINATE_CMD --region us-east-1"
```

TABLE 1-continued

Build Script Example

```
# schedule instance termination, just in case something goes wrong
echo "$EC2_TERMINATE_CMD" | at now + 30 min
loginfo "Scheduled self-termination in 30 minutes"
copy_logfile( ){
    aws s3 cp $LOGFILE $PACKAGE_S3_URI
    loginfo "Copied logfile $LOGFILE to $PACKAGE_S3_URI"
}
fatal( ) {
    loginfo "FATAL: $1"
    copy_logfile
    $EC2_TERMINATE_CMD
    exit 1
}
check_error( ) {
    ec=$?
    if [ $ec -gt 0 ]; then
    fatal "$1, [$ec]"
fi
}
mkdir $HOME >> $LOGFILE 2>&1
cd $HOME
# usage: install_yum_packages libgfortran.x86_64 R.x86_64 blas.x86_64
install_yum_packages( ) {
    cd $HOME
    loginfo "Installing yum packages $*"
    for package in $*; do
        sudo yum install -y $package >> $LOGFILE 2>&1
        check_error "Unable to install yum package $package"
    done
    loginfo "Installed yum packages $*"
}
# usage: install_r_package "rredis" "1.7.0"
install_r_package( ) {
    package=$1
    version=$2
    targz=${package}_${version}.tar.gz
    uri=https://cran.r-project.org/src/contrib/$targz
    mkdir -p $HOME/R/lib
    cd $HOME/R
    loginfo "Downloading R package: $uri"
    wget -a $LOGFILE $uri
    check_error "Unable to download R package $uri"
    tar -xvf $targz >> $LOGFILE 2>&1
    check_error "Unable to extract $targz"
    loginfo "Building R package $package $version"
    sudo R CMD build $package >> $LOGFILE 2>&1
    check_error "Unable to build R package $package"
    loginfo "Installing R package $package $version"
    sudo R CMD INSTALL $targz >> $LOGFILE 2>&1
    check_error "Unable to install R package $package"
    sudo rm -f $targz >> $LOGFILE 2>&1
    sudo rm -rf $package >> $LOGFILE 2>&1
    loginfo "Installed R package $package $version"
    cd $HOME
}
# usage: install_python_package "rpy2" "2.8.2"
install_python_package( ) {
    cd $HOME
    package=$1
    version=$2
    loginfo "Downloading Python package $package $version"
    pip install "$package==$version" >> $LOGFILE 2>&1
    check_error "Unable to install python package $package $version"
    loginfo "Installed Python package $package $version"
}
# http://docs.aws.amazon.com/lambda/latest/dg/with-s3-example-deployment-pkg.html
package_python( ) {
    loginfo "Packaging python"
    cd $VIRTUAL_ENV/lib/python2.7/site-packages
    zip -r9 $PACKAGE_ZIP * >> $LOGFILE 2>&1
    check_error "Unable to package python lib64 site-packages"
    cd $VIRTUAL_ENV/lib64/python2.7/site-packages
    check_error "Unable to package python lib64 site-packages"
    zip -r9 $PACKAGE_ZIP * >> $LOGFILE 2>&1
    cd $HOME
    loginfo "Packaged python"
}
# usage: install_r_package "rredis" "1.7.0"
```

TABLE 1-continued

Build Script Example

```
package_r( ) {
    mkdir -p $HOME/R/lib
    cd $HOME/R
    loginfo "Packaging R"
    sudo ldd /usr/lib64/R/bin/exec/R >> $LOGFILE 2>&1
    check_error "Unable to ldd R executable      /usr/lib64/R/bin/exec/R"
    cp -rf /usr/lib64/R/* $HOME/R/ >> $LOGFILE 2>&1
    check_error "Unable to copy R directory /usr/lib64/R/*"
    cp -f $HOME/R/bin/exec/R $HOME/R/ >> $LOGFILE 2>&1
    check_error "Unable to copy R executable $HOME/R/bin/exec/R"
    cp -f /usr/lib64/R/lib/libR.so* $HOME/R/lib/ >> $LOGFILE 2>&1
    check_error "Unable to copy R libraries      /usr/lib64/R/lib/libR.so*"
    zip -r9 $PACKAGE_ZIP * >> $LOGFILE 2>&1
    loginfo "Packaged R"
    cd $HOME
}
# usage: package_r_libraries libgomp libblas libgfortran
package_r_libraries( ) {
    loginfo "Packaging R libraries: $*"
    mkdir $HOME/R/lib
    for l in $*; do
        cp -f /usr/lib64/$l.so* $HOME/R/lib/ >> $LOGFILE 2>&1
        check_error "Unable to copy R library /usr/lib64/$l.so*"
    done
    loginfo "Packaged R libraries: $*"
}
# usage: publish_package
publish_package( ) {
    ls -l $PACKAGE_ZIP >> $LOGFILE 2>&1
    copy_logfile
    loginfo "Publishing $PACKAGE_ZIP to $PACKAGE_S3_URI"
    aws s3 cp --quiet $PACKAGE_ZIP $PACKAGE_S3_URI >> $LOGFILE 2>&1
    check_error "Unable to publish $PACKAGE_ZIP to $PACKAGE_S3_URI"
    loginfo "Published $PACKAGE_ZIP to $PACKAGE_S3_URI"
}
# First, make sure everything is up-to-date:
loginfo "Updating and upgrading yum"
sudo yum -y update
sudo yum -y upgrade
loginfo "Installing python and C development packages"
sudo yum install -y python27-devel python27-pip gcc gcc-c++ readline-devel
loginfo "Setting up virtualenv"
virtualenv $VIRTUAL_ENV
source $VIRTUAL_ENV/bin/activate
# userdata
install_yum_packages libgfortran.x86_64 R.x86_64 blas.x86_64 lapack.x86_64
install_r_package "rredis" "1.7.0"
install_r_package "RJSONIO" "1.3-0"
package_r_libraries libgomp libblas libgfortran libquadmath liblapack libtre
package_r
# generated from requirements.txt
install_python_package "rpy2" "2.8.2"
# userdata_footer
package_python
publish_package
loginfo "Terminating instance $INSTANCE_ID"
$EC2_TERMINATE_CMD
2017-04-18T15:40:01] Launching t2.micro instance from image ami-6869aa05 in
sg-35f8aa49 with instance profile name instance_admin
2017-04-18T15:40:03] Launched instance i-06abe35a6a85e4415
2017-04-18T15:40:03] Waiting for running state...
2017-04-18T15:40:05] Instance status: pending
2017-04-18T15:40:25] Instance status: running
2017-04-18T15:40:56] Updating and upgrading yum
2017-04-18T15:41:52] Installing python and C development packages
2017-04-18T15:42:07] Setting up virtualenv
2017-04-18T15:42:09] Installing yum packages libgfortran.x86_64 R.x86_64
blas.x86_64
lapack.x86_64
2017-04-18T15:42:52] Installed yum packages libgfortran.x86_64 R.x86_64
blas.x86_64
lapack.x86_64
2017-04-18T15:42:54] Downloading R package:
https://cran.r-project.org/src/contrib/rredis_1.7.0.tar.gz
2017-04-18T15:42:57] Building R package rredis 1.7.0
2017-04-18T15:43:01] Installing R package rredis 1.7.0
2017-04-18T15:43:04] Downloading R package:
https://cran.r-project.org/src/contrib/RJSONIO_1.3 -0.tar.gz
```

TABLE 1-continued

Build Script Example 2017-04-18T15:43:06] Installing R package RJSONIO 1.3-0
2017-04-18T15:43:13] Packaged R libraries: libgomp libblas libgfortran libquadmath liblapack libtre
2017-04-18T15:43:15] Packaging R
2017-04-18T15:43:30] Downloading Python package rpy2 2.8.2
2017-04-18T15:43:34] Packaging python
2017-04-18T15:43:39] Copied logfile /home/cd-pypi-publish/acp_rpy2-0.0.1-cp27-cp27m-manylinux_x86_64.log to s3://acp-platform-s-testing-sandbox1
2017-04-18T15:43:41] Published /home/cd-pypi-publish/acp_rpy2-0.0.1-cp27-cp27m-manylinux_x86_64.whl to s3://acp-platform-s-testing-sandbox1
2017-04-18T15:43:43] Instance status: shutting-down
2017-04-18T15:43:44] Terminating instance i-06abe35a6a85e4415

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways.

Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Acronyms used above include:
AVX: advanced vector extensions.
DVD: digital video disc.
EC2: elastic compute cloud.
EEC: error correction coding.
FTP: file transfer protocol.
GUI: graphical user interface.
HTML: hypertext markup language.
HTTP: hypertext transport protocol.
HTTPS: secure hypertext transport protocol.
MMX: a single instruction, multiple data instruction set.
REST: representational state transfer.
SIMD: single instruction multiple data.
SMTP: simple mail transport protocol.
SOAP: simple object access protocol.
SSE: streaming SIMD extensions Several implementations have been specifically described. However, many other implementations are also possible.

What is claimed is:

1. A system comprising:
a physical communication interface configured to implement:
a build communication channel to one or more cloud based serverless infrastructure providers; and
a requester communication channel to a build service requester;
hardware data storage comprising:
a build parameter data layer including:
for each serverless artifact in a library of serverless artifacts to support execution of a respective serverless function on a pre-execution unspecified hardware pool by implementing the serverless artifact for run-time specification of execution hardware:
a library artifact identifier of the serverless artifact to build the serverless artifact prior to execution of the respective serverless function on a pre-execution unspecified hardware pool;
a respective execution environment specifier of a respective hardware execution environment required by the respective serverless function that includes the serverless artifact;
a respective component specifier of a respective software pre-requisite for the serverless artifact; and a respective tool specifier of a respective build tool for the serverless artifact;

an infrastructure realization knowledge base defining for each serverless artifact in the library of serverless artifacts:

a respective environment mapping from serverless artifact build infrastructure available from a respective cloud based serverless infrastructure provider of the one or more cloud based serverless infrastructure providers to the respective execution environment specifier; and a build execution engine configured to:

receive a request for build service over the requester communication channel; responsive to a specific environment mapping, request a specific cloud based serverless infrastructure provider of the one or more cloud based serverless infrastructure providers to instantiate a specific serverless artifact build infrastructure for a specific serverless artifact from the library of serverless artifacts;

create a build script executable on the specific serverless artifact build infrastructure based on a specific component specifier and a specific tool specifier, the build script comprising:

build commands, that when executed, build the specific serverless artifact on the specific serverless artifact build infrastructure;

library insertion commands, that when executed, transmit the specific serverless artifact, when successfully built, over a library communication channel for insertion into a target serverless code library; and tear down commands, that when executed, at a time when the build infrastructure has completed building the specific serverless artifact, instruct the specific cloud based serverless infrastructure provider to tear down the specific serverless artifact build infrastructure but not the specific serverless artifact, where the tear down commands are further configured to automatically execute in the case where the build script does not complete successfully within a defined timeout window that starts when the specific serverless artifact build infrastructure is instantiated; and transmit the build script over the build communication channel to the specific cloud based serverless infrastructure provider for execution in the specific serverless artifact build infrastructure.

2. The system of claim 1, where:
the specific environment mapping captures a current state of changing infrastructure implementations at the specific cloud based serverless infrastructure provider.

3. The system of claim 2, where:
the current state captures how code currently built on the changing infrastructure is later executed as part of a specific serverless function associated with the specific serverless artifact.

4. The system of claim 3, where:
the current state captures an expected hardware execution environment for the code when it is later executed as part of the specific serverless function.

5. The system of claim 4, where:
the specific environment mapping specifies a specific serverless function infrastructure that results in the expected hardware execution environment, and the expected hardware execution environment is compatible with a hardware execution environment required by the specific serverless function.

6. The system of claim 3, where:
a specific execution environment specifier is configured to identify a processor architecture as a specific hardware execution environment for the specific serverless function.

7. The system of claim 3, where:
a specific execution environment specifier is configured to identify a memory architecture as a hardware execution environment for the specific serverless function.

8. The system of claim 1, where:
the specific component specifier is configured to identify a required library for building the specific serverless artifact.

9. The system of claim 1, where:
the specific tool specifier is configured to identify a compiler tool, an assembler tool, a linker tool, or any combination thereof for building the specific serverless artifact.

10. The system of claim 1, where the tear down commands are configured to execute immediately as part of completion of the build script.

11. A method comprising:
establishing, over a physical communication interface:
a build communication channel to one or more cloud based serverless infrastructure providers; and
a requester communication channel to a build service requester;

in hardware data storage, providing:
a build parameter data layer including:
for each serverless artifact in a library of serverless artifacts to support execution of a respective serverless function on a pre-execution unspecified hardware pool by implementing the serverless artifact for run-time specification of execution hardware:
a library artifact identifier of the serverless artifact to build the serverless artifact prior to execution of a respective serverless function on a pre-execution unspecified hardware pool;
a respective execution environment specifier of a respective hardware execution environment required by the respective serverless function that includes the serverless artifact;
a respective component specifier of a respective software pre-requisite for the serverless artifact; and
a respective tool specifier of a respective build tool for the serverless artifact;

an infrastructure realization knowledge base defining for each serverless artifact in the library of serverless artifacts:
a respective environment mapping from serverless artifact build infrastructure available from respective cloud based serverless infrastructure provider to the respective hardware execution environment; and executing a build execution engine, including:
receiving a request for build service over the requester communication channel;
responsive to a specific environment mapping, instructing a specific cloud based serverless infrastructure provider of the one or more cloud based serverless infrastructure providers to instantiate a specific serverless artifact build infrastructure for a specific serverless artifact from the library of serverless artifacts;
creating a build script executable on the specific serverless artifact build infrastructure based on a specific component specifier and a specific tool specifier, the build script comprising:

build commands, that when executed, build the specific serverless artifact on the specific serverless artifact build infrastructure;

library insertion commands, that when executed, transmit the specific serverless artifact, when successfully built, over a library communication channel for insertion into a target serverless code library; and tear down commands, that when executed, at a time when the build infrastructure has completed building the specific serverless artifact, instruct the specific cloud based serverless infrastructure provider to tear down the specific serverless artifact build infrastructure but not the specific serverless artifact, where the tear down commands are further configured to automatically execute in the case where the build script does not complete successfully within a defined timeout window that starts when the specific serverless artifact build infrastructure is instantiated; and transmitting the build script over the build communication channel to the specific cloud based serverless infrastructure provider for execution on the specific serverless artifact build infrastructure.

12. The method of claim 11, where:
the specific environment mapping captures a current state of changing infrastructure implementations at the specific cloud based serverless infrastructure provider.

13. The method of claim 12, where:
the current state captures how code currently built on the changing infrastructure is later executed as part of a specific serverless function associated with the specific serverless artifact.

14. The method of claim 13, where:
the current state captures an expected hardware execution environment for the code when it is later executed as part of the specific serverless function.

15. The method of claim 14, where:
the specific environment mapping specifies a specific serverless function infrastructure that results in the expected hardware execution environment, and the expected hardware execution environment is compatible with a hardware execution environment required by the specific serverless function.

16. The method of claim 13, where:
a specific execution environment specifier identifies a processor architecture as a hardware execution environment for the specific serverless function.

17. The method of claim 13, where:
a specific execution environment specifier identifies a memory architecture as a hardware execution environment for the specific serverless function.

18. A system comprising:
a physical communication interface configured to implement communication channels to one or more cloud based serverless infrastructure providers and one or more build service requestors;

hardware data storage comprising:
for each serverless artifact in a library of serverless artifacts to support execution of a respective serverless function on a pre-execution unspecified hardware pool by implementing the serverless artifact for run-time specification of execution hardware:

a respective build parameter data set comprising a respective hardware execution environment required by a respective serverless function that includes the serverless artifact to build;

a respective environment mapping from respective build infrastructure available from a respective cloud based serverless infrastructure provider of the one or more cloud based serverless infrastructure providers to the respective hardware execution environment; and a build execution engine configured to respond to a build service request received from a specific build service requester of the one or more build service requestors by:

instructing a specific cloud based serverless infrastructure provider of the one or more cloud based serverless infrastructure providers to instantiate a specific build infrastructure for a specific serverless artifact from the library of serverless artifacts;

obtaining a build script based on a specific build parameter data set for the specific serverless artifact, the build script executable on the specific build infrastructure, the build script comprising:

build commands, that when executed, build the specific serverless artifact on the specific build infrastructure;

library insertion commands, that when executed, transmit the specific serverless artifact, when successfully built, over the physical communication interface for insertion into a target serverless code library; and tear down commands, that when executed, at a time when the build infrastructure has completed building the specific serverless artifact, instruct the specific cloud based serverless infrastructure provider to tear down the specific serverless artifact build infrastructure but not the specific serverless artifact, where the tear down commands are further configured to automatically execute in the case where the build script does not complete successfully within a defined timeout window that starts when the specific serverless artifact build infrastructure is instantiated; and transmitting the build script over the physical communication interface to the specific cloud based serverless infrastructure provider for execution on the specific build infrastructure.

19. The system of claim 18, where:
the specific build parameter data set comprises in addition any combination of:
a library artifact identifier of the specific serverless artifact to build;
a component specifier of a software pre-requisite for the specific serverless artifact; and
a tool specifier of a build tool for the specific serverless artifact; and
compatibility for a specific environment mapping matches an expected hardware execution environment for code built on changing infrastructure implementations at the specific cloud based serverless infrastructure provider to the specific hardware execution environment required by a specific serverless function corresponding the specific serverless artifact.

20. The system of claim 18, where a specific environment mapping captures a current state of changing infrastructure implementations at the specific cloud based serverless infrastructure provider.

* * * * *

UNITED STATES PATENT AND TRADEMARK OFFICE
CERTIFICATE OF CORRECTION

PATENT NO. : 10,719,311 B2
APPLICATION NO. : 15/699184
DATED : July 21, 2020
INVENTOR(S) : Roger Foskett et al.

Page 1 of 1

It is certified that error appears in the above-identified patent and that said Letters Patent is hereby corrected as shown below:

In the Specification

In Column 2, Line 43, delete "technical" and insert in its place --technically--.

Signed and Sealed this
Twenty-second Day of September, 2020

Andrei Iancu
*Director of the United States Patent and Trademark Office*